United States Patent
Friedman et al.

(10) Patent No.: US 10,546,580 B2
(45) Date of Patent: Jan. 28, 2020

(54) SYSTEMS AND METHODS FOR DETERMINING CORRECT PRONUNCIATION OF DICTATED WORDS

(71) Applicant: Toyota Motor Engineering & Manufacturing North America, Inc., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: TOYOTA MOTOR ENGINEERING & MANUFACUTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/832,247

(22) Filed: Dec. 5, 2017

(65) Prior Publication Data
US 2019/0172446 A1 Jun. 6, 2019

(51) Int. Cl.
*G10L 15/00* (2013.01)
*G10L 15/187* (2013.01)
(Continued)

(52) U.S. Cl.
CPC ............ *G10L 15/187* (2013.01); *G06F 3/167* (2013.01); *G10L 15/065* (2013.01); *G10L 15/22* (2013.01);
(Continued)

(58) Field of Classification Search
CPC ........ G10L 15/26; G10L 15/265; G10L 15/07
(Continued)

(56) References Cited

U.S. PATENT DOCUMENTS

| | | | | |
|---|---|---|---|---|
| 4,615,680 A | * | 10/1986 | Tomatis | G09B 19/06 434/157 |
| 6,016,471 A | * | 1/2000 | Kuhn | G10L 13/08 704/266 |

(Continued)

FOREIGN PATENT DOCUMENTS

WO 2009129315 A1 10/2009

OTHER PUBLICATIONS

Bruguier et al., Learning Personalized Pronunciations for Contact Name Recognition, retrieved from https://www.bruguier.com/pub/personalized_pron.pdf, Sep. 8, 2017.
(Continued)

*Primary Examiner* — Daniel Abebe
(74) *Attorney, Agent, or Firm* — Dinsmore & Shohl LLP (57) ABSTRACT

Methods, systems, and vehicle components for providing a corrected pronunciation suggestion to a user are disclosed. A method includes receiving, by a microphone communicatively coupled to a processing device, a voice input from the user, the voice input including a particularly pronounced word. The method further includes comparing, by the processing device, the particularly pronounced word to one or more reference words in a reference table, determining, by the processing device, that the particularly pronounced word has been potentially mispronounced by the user based on the one or more reference words in the reference table, determining, by the processing device, a corrected pronunciation suggestion from the one or more reference words, and providing, via a user interface, the corrected pronunciation suggestion to the user.

14 Claims, 4 Drawing Sheets

(51) Int. Cl.
*G10L 15/26* (2006.01)
*G10L 15/22* (2006.01)
*G06F 3/16* (2006.01)
*G10L 15/065* (2013.01)

(52) U.S. Cl.
CPC ...... *G10L 15/265* (2013.01); *G10L 2015/223* (2013.01)

(58) Field of Classification Search
USPC .......................................................... 704/275
See application file for complete search history.

(56) References Cited

U.S. PATENT DOCUMENTS

| | | |
|---|---|---|
| 7,127,397 B2 | 10/2006 | Case |
| 7,280,963 B1 | 10/2007 | Beaufays et al. |
| 7,529,678 B2 | 5/2009 | Kobal |
| 8,275,621 B2 | 9/2012 | Alewine et al. |
| 9,620,104 B2 | 4/2017 | Naik et al. |
| 2006/0229870 A1* | 10/2006 | Kobal ............... G10L 15/22 704/252 |
| 2010/0057457 A1* | 3/2010 | Ogata ............... G10L 15/04 704/235 |
| 2015/0006178 A1 | 1/2015 | Peng et al. |
| 2015/0243278 A1* | 8/2015 | Kibre ............... G10L 15/075 704/243 |
| 2017/0221475 A1* | 8/2017 | Bruguier ........... G10L 15/065 |
| 2018/0190269 A1* | 7/2018 | Lokeswarappa .... G09B 5/04 |

OTHER PUBLICATIONS

Badr et al., Learning New Word Pronunciations from Spoken Examples, Interspeech 2010, retrieved from https://groups.csail.mit.edu/sls/publications/2010/Badr_Interspeech_2010.pdf, Sep. 26-30, 2010, Makuhari, Chiba, Japan.

* cited by examiner

SYSTEMS AND METHODS FOR DETERMINING CORRECT PRONUNCIATION OF DICTATED WORDS

BACKGROUND

Field

The present specification generally relates to receiving voiced inputs from a user and, more particularly, to systems and methods for determining whether a voiced input is correctly pronounced in a particular context.

Technical Background

Currently, some user interfaces that interact with a user via voiced inputs, such as certain vehicle user interfaces, rely on automated speech recognition (ASR) modules for recognizing a voiced input and generating electronic signals that correspond to the voiced input. Such ASR modules may have difficulty generating the appropriate electronic signals because of an inability to properly understand the voiced input, particularly in instances where the voiced input does not correspond to the correct pronunciation of a word in a particular context (i.e., regional location).

Accordingly, there exists a need for systems and methods that receive a voiced input and determine the appropriate pronunciation of the voiced input in a particular context.

SUMMARY

In one embodiment, a method for providing a corrected pronunciation suggestion to a user includes receiving, by a microphone communicatively coupled to a processing device, a voice input from the user, the voice input including a particularly pronounced word. The method further includes comparing, by the processing device, the particularly pronounced word to one or more reference words in a reference table, determining, by the processing device, that the particularly pronounced word has been potentially mispronounced by the user based on the one or more reference words in the reference table, determining, by the processing device, a corrected pronunciation suggestion from the one or more reference words, and providing, via a user interface, the corrected pronunciation suggestion to the user.

In another embodiment, a system for providing a corrected pronunciation suggestion to a user includes a microphone, a processing device communicatively coupled to the microphone, and a non-transitory, processor-readable storage medium. The non-transitory, processor-readable storage medium includes one or more programming instructions thereon that, when executed, cause the processing device to receive, from the microphone, data pertaining to a voice input from the user, the voice input including a particularly pronounced word. The non-transitory, processor-readable storage medium further includes one or more programming instructions thereon that, when executed, cause the processing device to compare the particularly pronounced word to one or more reference words in a reference table, determine that the particularly pronounced word has been potentially mispronounced by the user based on the one or more reference words in the reference table, determine a corrected pronunciation suggestion from the one or more reference words, and provide the corrected pronunciation suggestion to the user.

In yet another embodiment, a vehicle component for providing a corrected pronunciation suggestion to a user includes a microphone configured to receive a voice input from the user, the voice input including a particularly pronounced word and a processing device communicatively coupled to the microphone. The processing device is configured to compare the particularly pronounced word to one or more reference words in a reference table, determine that the particularly pronounced word has been potentially mispronounced by the user based on the one or more reference words in the reference table, determine a corrected pronunciation suggestion from the one or more reference words, and provide the corrected pronunciation suggestion to the user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure relates generally to systems and methods in a vehicle that receive a voiced input via a user interface, parse the input to discover any a particularly pronounced words, determine whether any supplemental information is provided with the word, and process the particularly pronounced word and the supplemental information to determine the user's intent in providing a command or other context regarding the command. For example, the systems and methods described herein may receive a word from the user that is not immediately recognized, followed by a voice dictation of the spelling of the word. The systems and methods can further either store the voice dictation and spelling as a voice tag for future reference, or can provide feedback to the user regarding a particular pronunciation of the word. Such systems and methods may be integrated with existing ASR modules to improve the functionality of the existing ASR modules.

Figure 1:
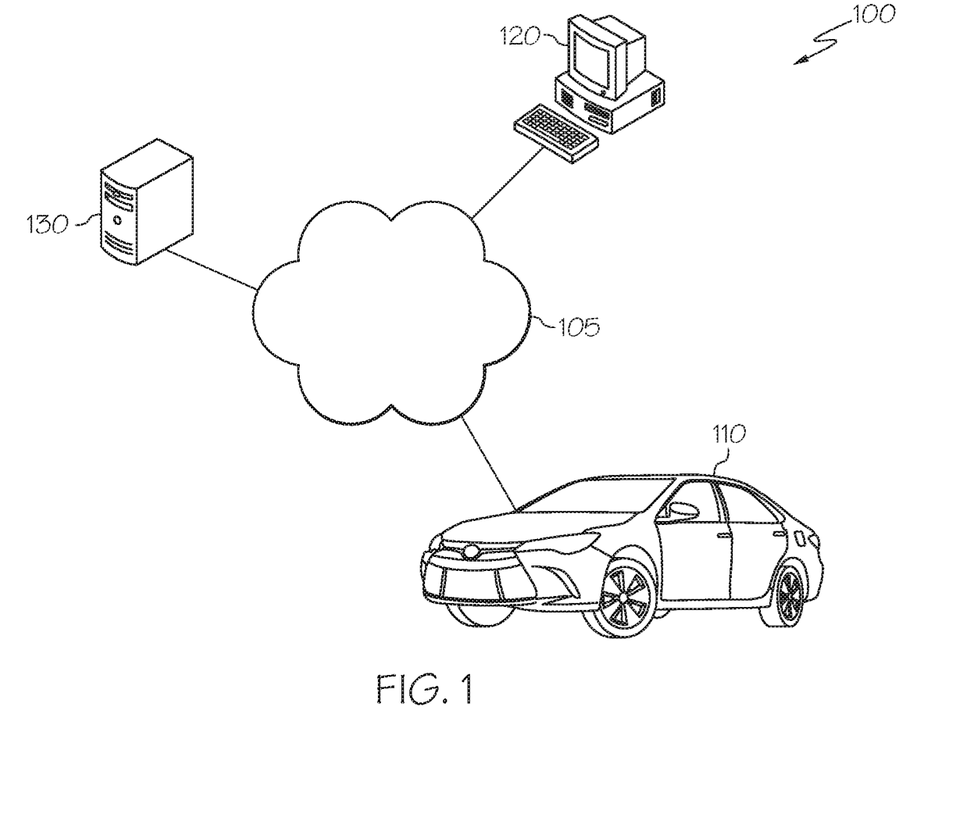
FIG. 1 schematically depicts an illustrative network having components for a system for determining pronunciation of dictated words according to one or more embodiments shown and described herein.

Referring now to the drawings, FIG. 1 depicts an illustrative network 100 having components for a system for determining pronunciation of dictated words according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, a vehicle 110, a user computing device 120, and a server computing device 130.

The vehicle 110 may generally be any vehicle with one or more onboard computing devices, particularly computing devices that contain hardware for receiving voice inputs from a user (such as a driver of the vehicle 110) and providing audible outputs to the user. Thus, the vehicle 110 and/or components thereof may perform one or more user-facing functions, such as receiving one or more inputs from the user (including voice inputs) or providing information to the user, as described in greater detail herein.

The user computing device 120 may generally be used as an interface between a user and the other components connected to the computer network 105. Thus, the user computing device 120 may be used to perform one or more user-facing functions, such as receiving one or more inputs from a user or providing information to the user, as described in greater detail herein. Accordingly, the user computing device 120 may include at least a display and/or input hardware, as described in greater detail herein, the event that the server computing device 130 requires oversight, updating, and/or correction, the user computing device 120 may be configured to provide the desired oversight, updating, and/or correction. The user computing device 120 may also be used to input additional data into a corpus of data stored on the server computing device 130. For example, the user computing device 120 may contain software programming or the like that allows a user to provide inputs relating to alternative pronunciations of words for the purposes of creating or updating a reference table or the like that contains information relating to words, their different pronunciations, and additional information that can be used to determine which pronunciation of a particular word is appropriate in a particular context.

The server computing device 130 may receive data from one or more sources, generate data, store data, index data, search data, and/or provide data to the user computing device 120 and/or the vehicle 110 (or components thereof).

It should be understood that while the user computing device 120 is depicted as a personal computer and the server computing device 130 is depicted as a server, these are nonlimiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user computing device 120 and the server computing device 130 may represent a plurality of computers, servers, databases, components, and/or the like.

Figure 2A:
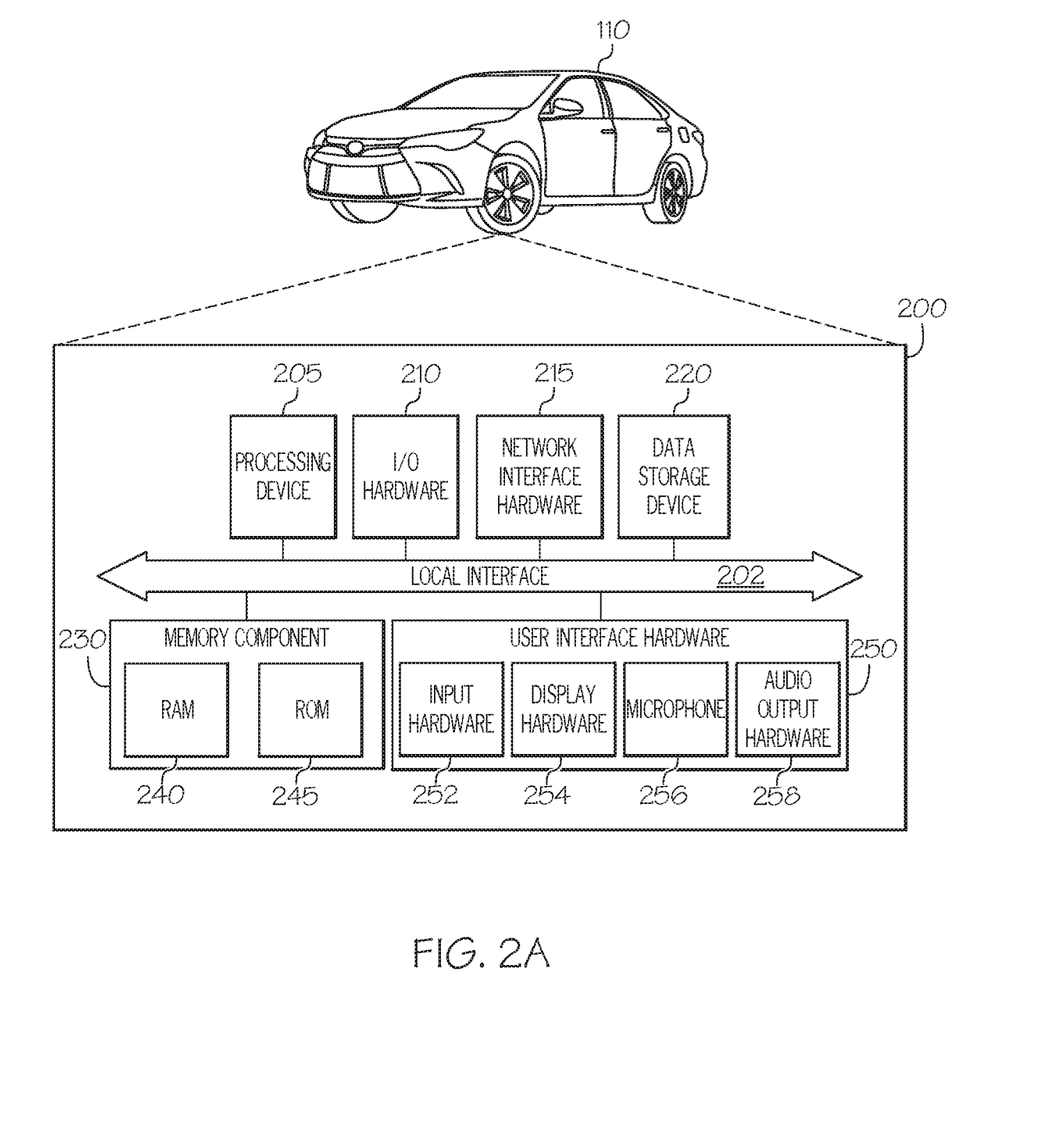
FIG. 2A schematically depicts illustrative hardware components of a vehicle that may be used in determining pronunciation of dictated words according to one or more embodiments shown and described herein.

FIG. 2A schematically depicts illustrative hardware components of the vehicle 110 that may be used in determining pronunciation of dictated words. While the components depicted in FIG. 2A are described with respect to the vehicle 110, it should be understood that similar components may also be used for the user computing device 120 and/or the server computing device 130 (FIG. 1) without departing from the scope of the present disclosure.

The vehicle 110 may include a vehicle component 200 having a non-transitory computer-readable medium for completing the various processes described herein, embodied as hardware, software, and/or firmware, according to embodiments shown and described herein. While in some embodiments the vehicle component 200 may be configured as a general purpose computer with the requisite hardware, software, and/or firmware, in other embodiments, the vehicle component 200 may also be configured as a special purpose computer designed specifically for performing the functionality described herein. In embodiments where the vehicle component 200 is a general purpose computer, the methods described herein provide a mechanism for improving the functionality of the vehicle component 200 by generating and/or modifying a reference table to include a voice tag corresponding to a user's particular pronunciation in particular contexts, thereby allowing the vehicle component 200 to more accurately recognize subsequent user inputs and also to customize the software to one or more particular users. The vehicle component 200 may generally be an onboard vehicle computing system, such as, for example, a vehicle navigation system, a vehicle infotainment system, and/or the like. In some embodiments, the vehicle component 200 may be a plurality of vehicle computing systems.

As also illustrated in FIG. 2A, the vehicle component 200 may include a processing device 205, I/O hardware 210, network interface hardware 215, a data storage device 220, a non-transitory memory component 230, and user interface hardware 250. A local interface 202, such as a bus or the like, may interconnect the various components.

The processing device 205, such as a computer processing unit (CPU), may be the central processing unit of the vehicle component 200, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 220 and/or the memory component 230).

The memory component 230 may be configured as a volatile and/or a nonvolatile computer-readable medium and, as such, may include random access memory 240 (including SRAM, DRAM, and/or other types of random access memory), read only memory (ROM) 245, flash memory, registers, compact discs (CD), digital versatile discs (DVD), and/or other types of storage components. The memory component 230 may include one or more programming instructions thereon that, when executed by the processing device 205, cause the processing device 205 to complete various processes, such as the processes described herein with respect to FIG. 3. Still referring to FIG. 2A, the programming instructions stored on the memory component 230 may be embodied as a plurality of software logic modules, where each logic module provides programming instructions for completing one or more tasks, as described in greater detail below with respect to FIG. 2B.

The network interface hardware 215 may include any wired or wireless networking hardware, such as a modem, LAN port, wireless fidelity (Wi-Fi) card, WiMax card, mobile communications hardware, and/or other hardware for communicating with other networks and/or devices.

The data storage device 220, which may generally be a storage medium, may contain one or more data repositories for storing data that is received and/or generated. The data storage device 220 may be any physical storage medium, including, but not limited to, a hard disk drive (HDD), memory, removable storage, and/or the like. While the data storage device 220 is depicted as a local device, it should be understood that the data storage device 220 may be a remote storage device, such as, for example, a server computing device or the like (e.g., the server computing device 130 of FIG. 1). Illustrative data that may be contained within the data storage device 220 is described below with respect to FIG. 2C.

Still referring to FIG. 2A, the I/O hardware 210 may communicate information between the local interface 202 and one or more other components of the vehicle 110. For example, the I/O hardware 210 may act as an interface between the vehicle component 200 and other components, such as HVAC systems, navigation systems, mobile phone systems, infotainment systems, and/or the like. In some embodiments, the I/O hardware 210 may be utilized to transmit one or more commands to the other components of the vehicle 110.

The user interface hardware 250 may include various hardware components for communicating with a user, such as, for example, input hardware 252, display hardware 254, a microphone 256, and audio output hardware 258 (e.g., devices that allow for direct or indirect user interaction with the vehicle component 200). The input hardware 252 may include devices such as, for example, a keyboard, a mouse, a joystick, a camera, a touch screen, and/or another device for receiving inputs from a user. The display hardware 254 may include devices such as a video card, a monitor, and/or another device for sending and/or presenting visual data to a user. The microphone 256 may include any device that can receive sound (e.g., voice inputs) and generate computer signals and/or data from the received sound. The audio output hardware 258 may be a speaker or the like that generates and presents audible data to a user, such as spoken words, tones, and/or the like.

Figure 2B:
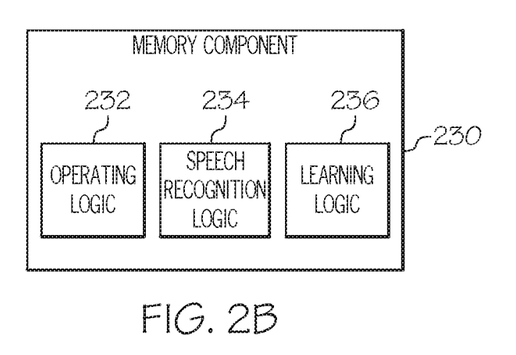
FIG. 2B schematically depicts an illustrative memory component containing illustrative logic components according to one or more embodiments shown and described herein.

In some embodiments, the program instructions contained on the memory component 230 may be embodied as a plurality of software modules, where each module provides programming instructions for completing one or more tasks. For example, FIG. 2B schematically depicts the memory component 230 containing illustrative logic components according to one or more embodiments shown and described herein. As shown in FIG. 2B, the memory component 230 may be configured to store various processing logic, such as, for example, operating logic 232, speech recognition logic 234, and/or learning logic 236 (each of which may be embodied as a computer program, firmware, or hardware, as an example). The operating logic 232 may include an operating system and/or other software for managing components of the vehicle component 200 (FIG. 2A). The speech recognition logic 234 may contain one or more software modules for receiving audio signals, determining whether the audio signals correspond to speech, determining the speech, and generating machine readable signals or code that correspond to the speech, as described in greater detail herein. The learning logic 236 may contain one or more software modules for learning a particular pronunciation of a word from a voiced input, as described in greater detail herein.

Figure 2C:
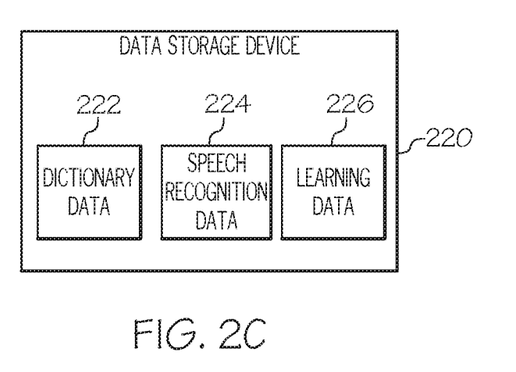
FIG. 2C schematically depicts an illustrative data storage device containing illustrative data components according to one or more embodiments shown and described herein.

FIG. 2C schematically depicts a block diagram of various data contained within a storage device (e.g., the data storage device 220) of a computing device and/or a vehicle component according to one or more embodiments shown and described herein. As shown in FIG. 2C, the data storage device 220 may include, for example, dictionary data 222, speech recognition data 224, and/or learning data 226. Dictionary data 222 may include, for example, data contained within a reference table, dictionary, or the like. In some embodiments, the dictionary data 222 may contain a reference table that is used to determine whether one or more phonemes correspond to a reference word, contain supplemental information, and/or the like. Speech recognition data 224 may generally be data that is generated and/or accessed by a speech recognition software program in determining one or more phonemes or the like from audio data, such as a voice input or the like. Learning data 226 may be may be modified dictionary data that corresponds to newly learned pronunciations of particular words in particular contexts, as described in greater detail herein.

It should be understood that the components illustrated in FIGS. 2A-2C are merely illustrative and are not intended to limit the scope of this disclosure. More specifically, while the components in FIGS. 2A-2C are illustrated as residing within the vehicle component 200 of the vehicle 110, this is a nonlimiting example. In some embodiments, one or more of the components may reside external to the vehicle component 200 and/or the vehicle 110. Similarly, as previously described herein, while FIGS. 2A-2C are directed to the vehicle component 200 of the vehicle 110, other components such as the user computing device 120 and the server computing device 130 may include similar hardware, software, and/or firmware.

As mentioned above, the various components described with respect to FIGS. 2A-2C may be used to carry out one or more processes and/or provide functionality for determining the correct pronunciation of dictated words in particular contexts. An illustrative example of the various processes is described with respect to FIG. 3.

While also referring to FIGS. 1 and 2A-2C, an input may be received at block 302. The input may generally be an audio input, such as a voice input from a user or the like. The input may be received via the microphone 256 and may be converted into computer-readable data that is supplied to the processing device 205 for completion of the remaining steps of FIG. 3.

Figure 3:
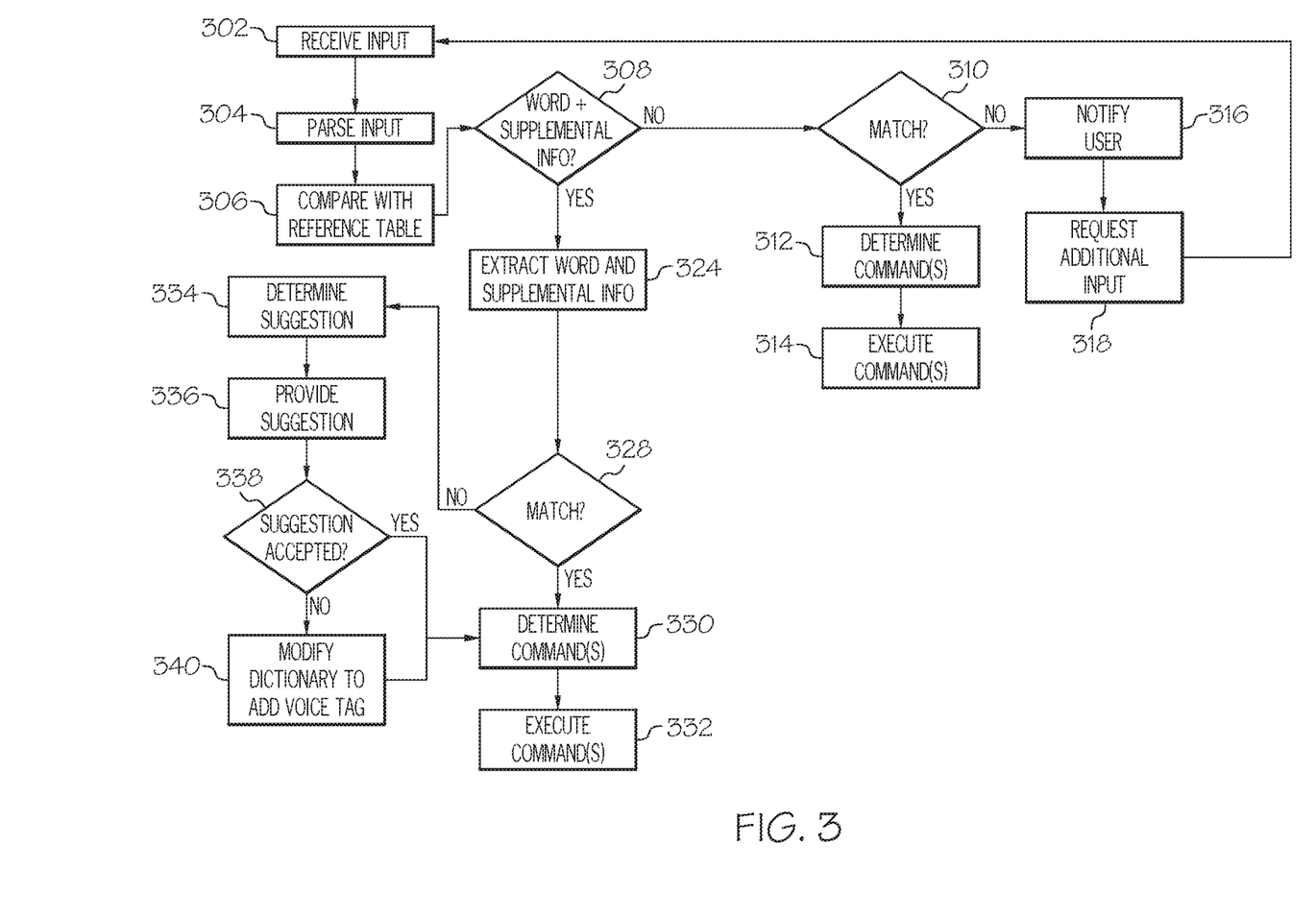
FIG. 3 depicts a flow diagram of an illustrative method of determining pronunciation of dictated words according to one or more embodiments shown and described herein.

The voice input that is received via the microphone 256 may generally include one or more particularly pronounced words and/or supplemental information corresponding to the particularly pronounced word (i.e., correlating information) such that the context of the particular pronunciation can be determined. Particularly pronounced words may include, for example, commonly pronounced words, words that are pronounced in a manner that is different from a commonly recognized pronunciation, a local pronunciation, a regional pronunciation, pronunciations made by speakers having a different primary language, and/or the like.

For example, the word "Houston" may generally be pronounced as "hyoo-stuhn" in the United States, referring to the city in Texas or its namesake, Sam Houston, but people that are local to New York City may be referring to Houston Street in Manhattan, which is pronounced "HOW-stan". As such, the supplemental information may provide additional context, intent, or meaning of the particularly pronounced word. For example, the supplemental information may be a spelling of the word (e.g., "H-O-U-S-T-O-N"), location information such as GPS coordinates, a preferred language setting, a default language setting, a preferred dialect setting, a default dialect setting, and/or the like, Such a particular pronunciation and/or supplemental information may be used to determine an intent, modify a dictionary or reference table, determine a correct pronunciation for a particular context, and/or the like, as described in greater detail herein.

Still referring to FIGS. 1, 2A-2C and 3, the input may be parsed at block 304. That is, the processing device 205 may analyze the input received from the microphone 256 to determine one or more words and/or supplemental information therefrom. Such a determination may be made by extracting phonemes or the like from the input and comparing individual phonemes or combinations of phonemes with one or more reference words in a reference table at block 306 to determine the words and/or supplemental information therefrom. It should be understood that the parsing at block 304 and the comparing at block 306 may be completed using any voice recognition technology that is now known or later developed to recognize speech from an audio input.

Accordingly, as a result of the comparison, a determination may be made at block 308 as to whether the input contains a particularly pronounced word and supplemental information. If supplemental information is not provided (i.e., only one or more words are provided), the process may move to block 310. If one or more words are provided with supplemental information, the process may move to block 324.

At block 310, a determination may be made as to whether any of the phonemes match a reference word from the reference table. Such a match may generally be a common pronunciation of a word without accounting for any context, regional factors, local factors, dialects, and/or the like. If so, the process may proceed to block 312. If not, the process may proceed to block 316.

At block 312, one or more vehicle commands may be determined from the reference words that were discovered in the reference table. The vehicle commands are not limited by this disclosure, and may generally be any command that can be electronically transmitted to a vehicle component and/or executable by a vehicle component. Illustrative examples of vehicle commands include, but are not limited to, commands for controlling HVAC functions, commands for controlling infotainment functions, commands for controlling navigation system functions, commands for completing a phone call, commands for adjusting vehicle settings, and/or the like. Once the one or more commands have been determined, the one or more commands may be executed at block 314. Execution may be completed by the processing device 205 or by transmitting signals via the I/O hardware 210 to one or more other vehicle components to cause the one or more other vehicle components to execute the commands. For example, if the command is determined to be a command to adjust the cabin temperature, the processing device 205 may transmit a signal via the I/O hardware 210 to an HVAC component, which executes the command by adjusting the temperature of the air blown into the cabin.

At block 316, the processing device 205 may notify the user that the voiced input was not understood and may request an additional input at block 318. The steps completed at blocks 316 and 318 may generally be completed via the user interface hardware 250, such as displaying an error message and a request via the display hardware 254, sounding an audible error message and/or tone via the audio output hardware 258, and/or the like. Accordingly, the process may return to block 302 if additional inputs are provided by the user.

At block 324, the processing device 205 may extract the one or more words and the correlating information from the input. That is, the processing device 205 may determine which portions of the input comprise phonemes corresponding to one or more words and which portions of the input comprise phonemes corresponding to supplemental information and separate the input into the one or more potential words and potential supplemental information. Such an extraction may be completed using any word recognition software now known or later developed that is capable of separating spoken words from other sounds, such as, for example, letters that are spoken for the purposes of spelling a word. Such an extraction may also include obtaining supplemental information from sources other than the input, such as location data from a GPS system, system setting data pertaining to languages and/or dialects, and/or the like.

As part of extracting, a determination may be made as to whether the extracted phonemes that correspond to potential words from the input match a word from the reference table at block 328. Such a match may account for a particular context based on the supplemental information. If so, the process may proceed to block 330. If not, the process may proceed to block 334.

At block 330, one or more vehicle commands may be determined from the words that were discovered in the reference table. The vehicle commands are not limited by this disclosure, and may generally be any command that can be electronically transmitted to a vehicle component and/or executable by a vehicle component. Illustrative examples of vehicle commands include, but are not limited to, commands for controlling HVAC functions, commands for controlling infotainment functions, commands for controlling navigation system functions, commands for completing a phone call, commands for adjusting vehicle settings, and/or the like. Once the one or more commands have been determined, the one or more commands may be executed at block 332. Execution may be completed by the processing device 205 or by transmitting signals via the I/O hardware 210 to one or more other vehicle components to cause the one or more other vehicle components to execute the commands. For example, if the command is determined to be a command to adjust the cabin temperature, the processing device 205 may transmit a signal via the I/O hardware 210 to an HVAC component, which execute the command by adjusting the temperature of the air blown into the cabin.

If the extracted phonemes do not correspond to potential words from the reference table, a suggested pronunciation of non-matching word may be determined at block 334 and provided at block 336. Such a determination may generally be completed by matching the supplemental information to words from the reference table to determine a particular context. For example, if the supplemental information contains a spelling of a word, the spelled word may be looked up in the reference table and the stored pronunciation of the spelled word may be provided as the suggestion. In another example, if the supplemental information contains GPS coordinates corresponding to a certain geographic location and the geographic location indicates a particularly pronounced word that has certain phonemes that are similar to the unrecognized word, the particularly pronounced word may be provided as the suggestion.

The suggestion may generally be provided via the user interface hardware 250, such as by displaying a suggested word on the display hardware 254 or by voicing the suggested word having the particular pronunciation via the audio output hardware 258. For example, if a user voices the word "hyoo-stuhn" and the supplemental information corresponds to GPS data indicating that the user is in a vehicle in Manhattan and/or the user provides the spelling (i.e., "H-O-U-S-T-O-N"), the vehicle component 200, after determining the context (i.e., local pronunciation) may provide an audible output that states "I'm sorry, that word was not recognized. Did you mean 'HOW-stan' street in New York?" and may further provide an interface for allowing the user to respond, such as "YES" and "NO" buttons via the input hardware 252 and/or the display hardware 254, or provide the user with an ability to voice a "yes" or "no" answer via the microphone 256.

At block 338, a determination may be made as to whether the suggestion provided to the user has been accepted by the user. That is, the vehicle component 200 may receive an input from the user corresponding to a "yes" or a "no" response (e.g., a voiced input via the microphone 256 or a physical input via the input hardware 252 and/or the display hardware 254). If the input corresponds to an accepted suggestion, the process may proceed to block 330. If the suggestion is not accepted, the process may proceed to block 340.

At block 340, the processing device 205 may modify the reference table to add a voice tag corresponding to the user's pronunciation and/or any information that can be used to determine context such that the user's pronunciation can be later recognized and accessed. As such, the reference table may also be modified to include supplemental information that allows a context to be discerned from the user's pronunciation, which can be accessed and recognized in the future, such as a spelling of the word, location coordinates, or the like. It should be understood that, in some embodiments, the reference table may be modified only after querying the user regarding modification (e.g., "Would you like to store this word for future access?") and/or querying the user regarding supplemental information (e.g., "Please spell this word") if such information is not available. After the voice tag has been added, the process may proceed to block 330.

It should now be understood that the systems, methods, and vehicle components described herein may function to determine an intended word from a user's pronunciation of that word and from supplemental information. If the word is mispronounced, the systems, methods, and vehicle components may provide a suggestion to the user. If the word is correctly pronounced in certain contexts (such as a regional pronunciation), the user's particular pronunciation may further be stored for future use such that subsequent pronunciations of the same word in similar contexts are instantly recognized and commands are executed accordingly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing a corrected pronunciation suggestion to a user of a vehicle, the method comprising:
receiving, by a microphone communicatively coupled to a processing device, a voice input to a navigation system user interface from the user of the vehicle, wherein the voice input comprises a particularly pronounced word and a voiced spelling of the particularly pronounced word;
determining, by the processing device, supplemental information corresponding to the particularly pronounced word, the supplemental information comprising GPS coordinates of the vehicle at the time the voice input was received;
comparing, by the processing device, the particularly pronounced word and the voiced spelling to one or more reference words in a reference table for a regional dialect selected based on the GPS coordinates;
determining, by the processing device, that the particularly pronounced word has been potentially mispronounced by the user of the vehicle based on the voiced spelling and the one or more reference words in the reference table;
determining, by the processing device, the corrected pronunciation suggestion from the voiced spelling and the one or more reference words; and
providing, via a user interface, the corrected pronunciation suggestion to the user of the vehicle.

2. The method of claim 1, further comprising:
receiving an input corresponding to an acceptance of the corrected pronunciation suggestion;
determining a command corresponding to the voice input and the corrected pronunciation suggestion; and
executing the command.

3. The method of claim 1, further comprising:
receiving an input corresponding to a rejection of the corrected pronunciation suggestion; and
modifying the reference table to include a voice tag corresponding to the particularly pronounced word.

4. The method of claim 3, further comprising:
determining a command corresponding to the voice input and the particularly pronounced word; and
executing the command.

5. The method of claim 1, wherein providing the corrected pronunciation suggestion to the user comprises providing a local pronunciation suggestion or a regional pronunciation suggestion to the user.

6. A system for providing a corrected pronunciation suggestion to a user of a vehicle, the system comprising:
a microphone;
a processing device communicatively coupled to the microphone; and
a non-transitory, processor-readable storage medium, the non-transitory, processor-readable storage medium comprising one or more programming instructions thereon that, when executed, cause the processing device to:
receive, from the microphone, data pertaining to a voice input to a navigation system user interface from the user, wherein the voice input comprises a particularly pronounced word and a voiced spelling of the particularly pronounced word,
determine supplemental information corresponding to the particularly pronounced word, the supplemental information comprising GPS coordinates of the vehicle at the time the voice input was received,
compare the particularly pronounced word and the voiced spelling to one or more reference words in a reference table for a regional dialect selected based on the GPS coordinates,
determine that the particularly pronounced word has been potentially mispronounced by the user of the vehicle based on the voiced spelling and the one or more reference words in the reference table,
determine the corrected pronunciation suggestion from the voiced spelling and the one or more reference words, and provide the corrected pronunciation suggestion to the user of the vehicle.

7. The system of claim 6, wherein the system is located in the vehicle.

8. The system of claim 6, wherein the non-transitory, processor-readable storage medium further comprises one or more programming instructions that, when executed, cause the processing device to compare the supplemental information to the one or more reference words in the reference table.

9. The system of claim 6, wherein the non-transitory, processor-readable storage medium further comprises one or more programming instructions that, when executed, cause the processing device to:
receive an input corresponding to an acceptance of the corrected pronunciation suggestion;
determine a command corresponding to the voice input and the corrected pronunciation suggestion; and
execute the command.

10. The system of claim 6, wherein the non-transitory, processor-readable storage medium further comprises one or more programming instructions that, when executed, cause the processing device to:
receive an input corresponding to a rejection of the corrected pronunciation suggestion; and
modify the reference table to include a voice tag corresponding to the particularly pronounced word.

11. The system of claim 10, wherein the non-transitory, processor-readable storage medium further comprises one or more programming instructions that, when executed, cause the processing device to:
determine a command corresponding to the voice input and the particularly pronounced word; and
execute the command.

12. The system of claim 6, wherein the one or more programming instructions that, when executed, cause the processing device to provide the corrected pronunciation suggestion to the user further cause the processing device to provide a local pronunciation suggestion or a regional pronunciation suggestion to the user.

13. A vehicle component for providing a corrected pronunciation suggestion to a user of the vehicle, the vehicle component comprising:
a microphone configured to receive a voice input from the user of the vehicle when the user of the vehicle voices a request to a navigation system user interface, wherein the voice input comprises a particularly pronounced word and a voiced spelling of the particularly pronounced word; and
a processing device communicatively coupled to the microphone and configured to:
determine supplemental information corresponding to the particularly pronounced word, the supplemental information comprising GPS coordinates of the vehicle at the time the voice input was received,
compare the particularly pronounced word and the voiced spelling to one or more reference words in a reference table for a regional dialect selected based on the GPS coordinates,
determine that the particularly pronounced word has been potentially mispronounced by the user of the vehicle based on the voiced spelling and the one or more reference words in the reference table,
determine the corrected pronunciation suggestion from the voiced spelling and the one or more reference words, and
provide the corrected pronunciation suggestion to the user of the vehicle.

14. The vehicle component of claim 13, wherein:
the voice input further comprises supplemental information corresponding to the particularly pronounced word; and
the corrected pronunciation suggestion is a local pronunciation suggestion or a regional pronunciation suggestion.

* * * * *